(12) United States Patent
Cui et al.

(10) Patent No.: US 10,029,299 B2
(45) Date of Patent: Jul. 24, 2018

(54) THREE-DIMENSIONAL MANUFACTURING METHODS AND SYSTEMS FOR TURBINE COMPONENTS

(71) Applicant: General Electric Company, Schenectady, NY (US)

(72) Inventors: Yan Cui, Greer, SC (US); Srikanth Chandrudu Kottilingam, Simpsonville, SC (US); David Edward Schick, Greenville, SC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 132 days.

(21) Appl. No.: 14/794,839

(22) Filed: Jul. 9, 2015

(65) Prior Publication Data

US 2017/0008072 A1 Jan. 12, 2017

(51) Int. Cl.
*B22C 9/02* (2006.01)
*B22C 9/10* (2006.01)
*B22C 9/24* (2006.01)
*B22C 1/00* (2006.01)
*B22C 1/16* (2006.01)
*B22D 25/02* (2006.01)
*B22C 9/04* (2006.01)
*B22D 29/00* (2006.01)
*B33Y 10/00* (2015.01)
*B33Y 80/00* (2015.01)

(52) U.S. Cl.
CPC .................. *B22C 9/02* (2013.01); *B22C 1/00* (2013.01); *B22C 1/16* (2013.01); *B22C 9/04* (2013.01); *B22C 9/10* (2013.01); *B22C 9/24* (2013.01); *B22D 25/02* (2013.01); *B22D 29/00* (2013.01); *B33Y 10/00* (2014.12); *B33Y 80/00* (2014.12)

(58) Field of Classification Search
CPC .. B22C 9/00; B22C 9/10; B22C 9/105; B22C 9/22; B22D 25/02; B22D 29/00
See application file for complete search history.

(56) References Cited

U.S. PATENT DOCUMENTS 6,024,787 A 2/2000 Lee
6,595,749 B2 7/2003 Lee et al.
(Continued)

FOREIGN PATENT DOCUMENTS

DE 102013003303 A1 8/2014

OTHER PUBLICATIONS

Bassoli E et al.,"3D printing technique applied to rapid casting", Rapid Prototyping Journal, MCB University Press, Bradford, GB, Jan. 1, 2007 (Jan. 1, 2007), pp. 148-155, vol. No. 13, Issue No. 3, XP002695629, ISSN: 1355-2546, DOI: 10.1108/13552540710750898.
(Continued)

*Primary Examiner* — Kevin P Kerns
*Assistant Examiner* — Steven S Ha
(74) *Attorney, Agent, or Firm* — Eversheds Sutherland (US) LLP

(57) ABSTRACT

The present application provides a method of producing a component. The method may include the steps of creating a dissolvable ceramic material mold in an additive manufacturing process, casting a metallic material in the dissolvable ceramic material mold, creating the component, and dissolving the dissolvable ceramic material. The component may be a turbine component.

20 Claims, 3 Drawing Sheets

(56) References Cited

U.S. PATENT DOCUMENTS

| | | | |
|---|---|---|---|
| 7,278,829 B2 | 10/2007 | Roedl et al. | |
| 7,550,518 B2* | 6/2009 | Bredt | B29C 41/003 106/162.9 |
| 7,624,787 B2 | 12/2009 | Lee et al. | |
| 7,685,711 B2 | 3/2010 | Kelly | |
| 7,938,168 B2 | 5/2011 | Lee et al. | |
| 8,037,881 B2 | 10/2011 | Pentafragas | |
| 8,726,501 B2 | 5/2014 | Schoonover et al. | |
| 9,033,652 B2 | 5/2015 | Molter et al. | |
| 2014/0034144 A1 | 2/2014 | Cui et al. | |
| 2014/0037981 A1 | 3/2014 | Cui et al. | |
| 2014/0342139 A1 | 11/2014 | Cui et al. | |
| 2015/0030460 A1 | 1/2015 | Kottilingam et al. | |
| 2015/0052751 A1 | 2/2015 | Hu et al. | |
| 2015/0064019 A1 | 3/2015 | Lacy et al. | |
| 2015/0068629 A1 | 3/2015 | Kottilingam et al. | |
| 2015/0093506 A1 | 4/2015 | Bucci et al. | |
| 2015/0111060 A1 | 4/2015 | Kottilingam et al. | |
| 2015/0147164 A1 | 5/2015 | Cui et al. | |
| 2015/0159257 A1 | 6/2015 | Lin et al. | |
| 2015/0322799 A1* | 11/2015 | Xu | F01D 5/18 416/231 R |
| 2015/0375419 A1 | 12/2015 | Günther et al. | |

OTHER PUBLICATIONS

Haihua et al., "Fabrication of integral ceramic mold for investment casting of hollow turbine blade based on stereolithography", Rapid Prototyping Journal, 2009, pp. 233-236, vol. No. 15, Issue No. 4, XP002763962.

Koltygin A V et al., "Development of a Substitute for Z Cast Molding Sand Used on Installations of 3D Printing for Obtaining Aluminum, Magnesium, and Iron Casting", Russian Journal of Non-Ferrous Metals, Allerton Press, Inc, Heidelberg, Mar. 7, 2012 (Mar. 7, 2012), pp. 38-41, vol. No. 53, Issue No. 1, XP035024572, ISSN: 1934-970X, DOI: 10.3103/S1067821212010129.

Druschitz A et al., "Additive Manufacturing Supports the Production of Complex Castings", Shape Casting: 5TH International Symposium 2014, Jan. 1, 2014 (Jan. 1, 2014), pp. 51-57, XP009192302.

Sarojrani Pattnaik et al., "A review of rapid prototyping integrated investment casting processes", Proceedings of the Institution of Mechanical Engineers, Part L: Journal of Materials: Design and Applications, Jan. 1, 2014 (Jan. 1, 2014), pp. 249-277, Volume No. 228, Issue No. 4, XP009192299.

European Search Report and Opinion issued in connection with corresponding European Application No. 16178546.4 dated Nov. 18, 2016.

Examination Report issued in European Patent Application No. 16178546.4, Jan. 2, 2018 (7 pgs.).

Armstrong Mold Corporation: "tehnical Information: Plaster Mold Process", Jun. 11, 2015 (http://web.archive.org/web/20150611165118/http://www.armstrongmold.com/pages/plastermold2-tech.html) (2 pgs.).

\* cited by examiner

THREE-DIMENSIONAL MANUFACTURING METHODS AND SYSTEMS FOR TURBINE COMPONENTS

TECHNICAL FIELD

The present application and the resultant patent relate generally to gas turbine engines and more particularly relate to three-dimensional manufacturing methods and systems for complex hot gas path turbine components and the like with improved cooling capacity.

BACKGROUND OF THE INVENTION

Gas turbine engine components such as buckets, nozzles, and other components in the hot gas path, may be produced in an investment casting process. Generally described, a ceramic core and shell may be produced separately. The ceramic core may be produced by pouring a ceramic slurry into a metal die and solidifying the ceramic material. The ceramic core then may be encased in wax and a ceramic shell may be formed around the wax pattern. The wax that encases the ceramic core then may be removed to form a ceramic mold in which a metallic component may be cast. Once the metallic component is cooled, the shell materials may be stripped away and the ceramic core may be leached away to form the finished product. Other types of component casting methods may be used.

Components having complex geometry such as internal passages and voids therein may be difficult to cast or otherwise created. For example, such complex geometries may include buckets and nozzles with internal airflow passages for cooling. The tooling used for the manufacture of such parts may be expensive and time consuming to create. Moreover, the chemicals used to leach away the ceramic material may be toxic and hazardous to use.

SUMMARY OF THE INVENTION

The present application and the resultant patent thus provide a method of producing a component. The method may include the steps of creating a dissolvable ceramic material mold in an additive manufacturing process, casting a metallic material in the dissolvable ceramic material mold, creating the component, and dissolving the dissolvable ceramic material. The component may be a turbine component.

The present application and the resultant patent further provide a combined core and mold for creating a turbine component. The combined core and mold may include an inner core and an outer mold. The inner core and the outer mold may define a sidewall and a number of inner ribs therebetween. The inner core and the outer mold may be made from a dissolvable ceramic material suitable for an additive manufacturing process. The turbine component may be an airfoil or other type of hot gas path component.

The present application and the resultant patent further provide a method of producing a turbine airfoil with a number of internal channels. The method may include the steps of creating a combined core and mold of a dissolvable ceramic material in an additive manufacturing process, casting a metallic material in the combined core and mold, creating the turbine airfoil, and dissolving the dissolvable ceramic material within the internal channels.

These and other features and improvements of the present application and the resultant patent will become apparent to one of ordinary skill in the art upon review of the following detailed description when taken in conjunction with the several drawings and the appended claims.

DETAILED DESCRIPTION

Figure 1:
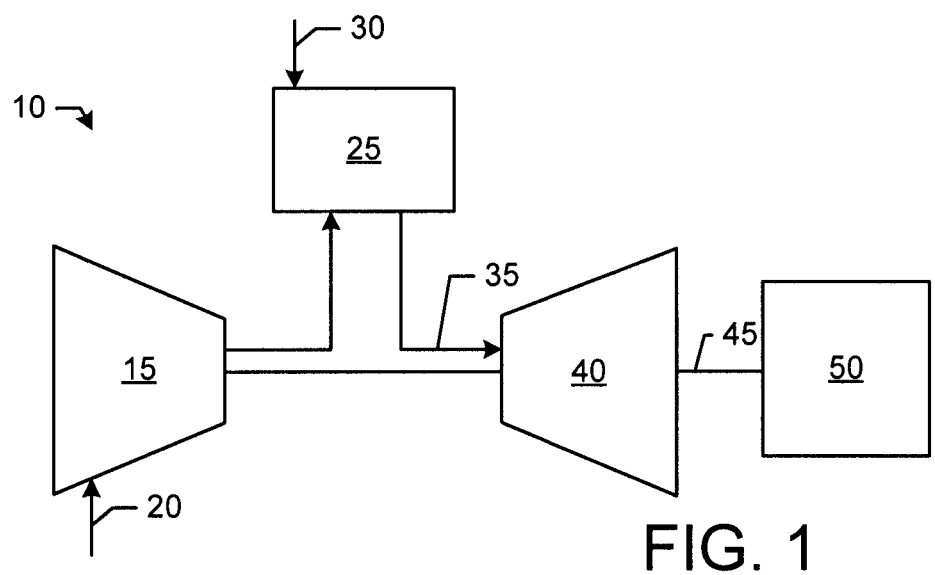
FIG. 1 is a schematic diagram of a gas turbine engine showing a compressor, a combustor, a turbine, and a load.

Referring now to the drawings, in which like numerals refer to like elements throughout the several views, FIG. 1 shows a schematic view of gas turbine engine 10 as may be used herein. The gas turbine engine 10 may include a compressor 15. The compressor 15 compresses an incoming flow of air 20. The compressor 15 delivers the compressed flow of air 20 to a combustor 25. The combustor 25 mixes the compressed flow of air 20 with a compressed flow of fuel 30 and ignites the mixture to create a flow of combustion gases 35. Although only a single combustor 25 is shown, the gas turbine engine 10 may include any number of combustors 25. The flow of combustion gases 35 is in turn delivered to a turbine 40. The flow of combustion gases 35 drives the turbine 40 so as to produce mechanical work. The mechanical work produced in the turbine 40 drives the compressor 15 via a shaft 45 and an external load 50 such as an electrical generator and the like.

The gas turbine engine 10 may use natural gas, various types of syngas, liquid fuels, and/or other types of fuels and blends thereof. The gas turbine engine 10 may be any one of a number of different gas turbine engines offered by General Electric Company of Schenectady, N.Y., including, but not limited to, those such as a 7 or a 9 series heavy duty gas turbine engine and the like. The gas turbine engine 10 may have different configurations and may use other types of components. Other types of gas turbine engines also may be used herein. Multiple gas turbine engines, other types of turbines, and other types of power generation equipment also may be used herein together.

Figure 2:
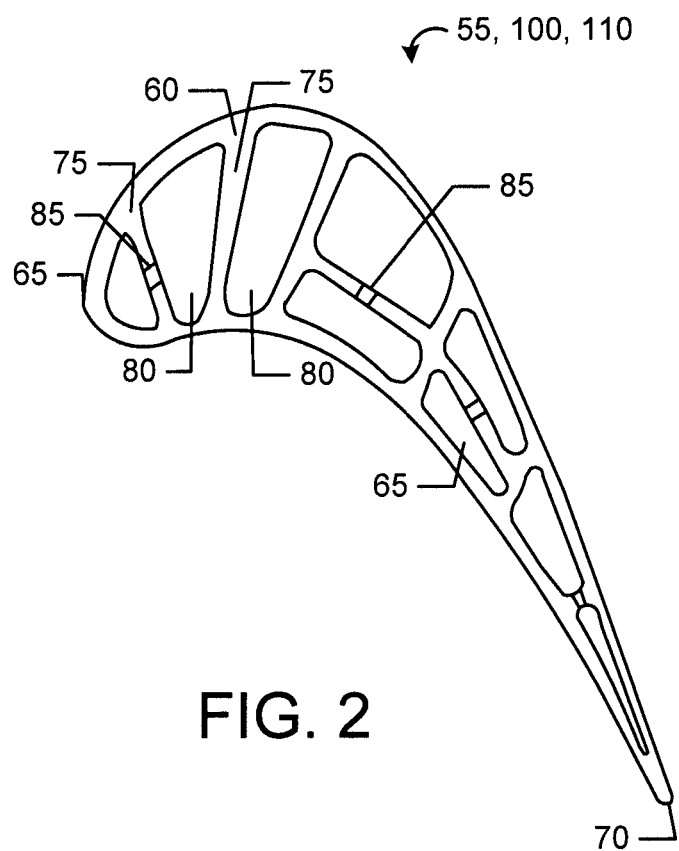
FIG. 2 is a sectional view of an airfoil that may be used with the gas turbine engine of FIG. 1.

FIG. 2 shows an example of a turbine airfoil 55 that may be used with the gas turbine engine 10 of FIG. 1. The airfoil 55 may include a main sidewall 60. The main sidewall 60 may extend from a leading edge 65 to a trailing edge 70. Within the main sidewall 60, the airfoil 55 may have a number of internal ribs 75. The main sidewall 60 and the internal ribs 75 may define any number of channels 80 therein. The channels 80 may permit a flow of a fluid such as air to provide cooling to the airfoil 55. A number of crossover holes 85 also may extend through the internal ribs 75 and between the channels 80. The airfoil 55 is described herein for the purpose of example only. Many different types of airfoils with many different internal configurations may be used. Likewise, many different types of hot gas path components and other types of turbine components may be used.

As described above, the airfoil 55 traditionally has been produced in an investment casting process. Specifically, the channels 80 may be formed via a ceramic core while the sidewall 60 may be formed within an outer ceramic mold. Certain shapes and configurations, however, may be difficult to manufacture in such an investment casting process.

Instead of the investment casting process and the like, an airfoil 100 or other type of turbine component 110 as may be described herein may be manufactured in an additive manufacturing system. Such an additive manufacturing system may include a three-dimensional printing process, an additive printing process, and the like. Examples of such systems and processes may include extrusion base techniques, jetting, selective laser sintering, powder/binder jetting, electron beam melting, stereo-lithographic processes, and the like. Specifically, binder jetting is an additive manufacturing process in which a liquid binding agent is selectively deposited to join powder particles. Layers of material then may be bonded to form an object. The object thus develops through the layering of the powder and the binding. Binder jetting may be similar to traditional paper printing in that the binder functions like the ink as it moves across the layers of powder which function like paper to form the final product. Other types of manufacturing processes may be used herein.

Such a binder jetting process may be used with ceramic materials and the like. More particularly, the process may be used with water soluble ceramic materials. For example, a suitable material may include about sixty to seventy weight percent (60 to 70%) alumina ($AL_2O_3$) flour, about fifteen to twenty-five weight percent (15 to 25%) zircon ($ZrSiO_4$) flour, about five to fifteen weight percent (5 to 15%) sodium hydrogen phosphate ($Na_2HPO_4$), and about five weight percent (5%) of cane sugar. More preferably, the ceramic core may contain about sixty-five weight percent (65%) of alumina flour, about twenty weight percent (20%) of zircon flour, about ten weight percent (10%) of sodium hydrogen phosphate, and about five weight percent (5%) of cane sugar. In this composition, the alumina and the zircon may be used primarily as fillers. The sodium hydrogen phosphate may be a binding agent. The cane sugar may improve the surface smoothness and the wet strength of the resultant water-soluble ceramic core. Other types of ceramics, water soluble ceramics, and other materials may be used herein.

Figure 3:
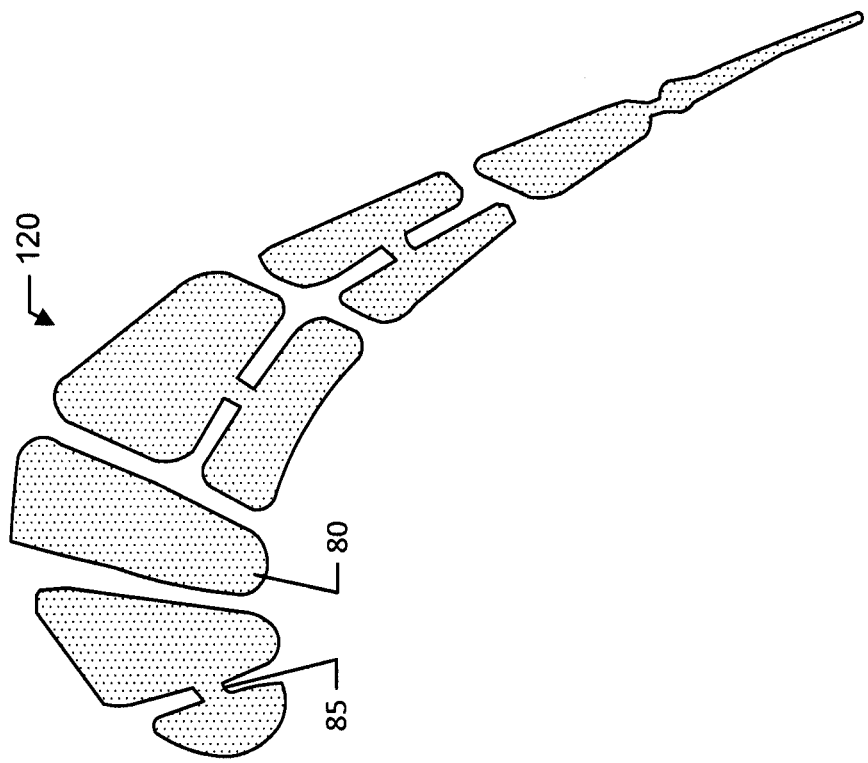
FIG. 3 is a sectional view of a core that may be used to manufacture the airfoil of FIG. 2.

FIG. 3 shows an example of a core 120 that may be used to create the airfoil 100 or other type of turbine component 110 and the like. As is shown, the core 120 corresponds to the channels 80 and crossover holes 85 with the space in-between corresponding to the internal ribs 75. The core 120 may be made from a ceramic material and more specifically, may be made from a water soluble ceramic material similar to that described above and the like. Other types of materials may be used herein. The core 120 may be made from an additive manufacturing process such as the binder jetting process described above and the like. Other types of additive manufacturing processes including but not limited to those described above also may be used herein. Other components and other configurations may be used herein.

Figure 4:
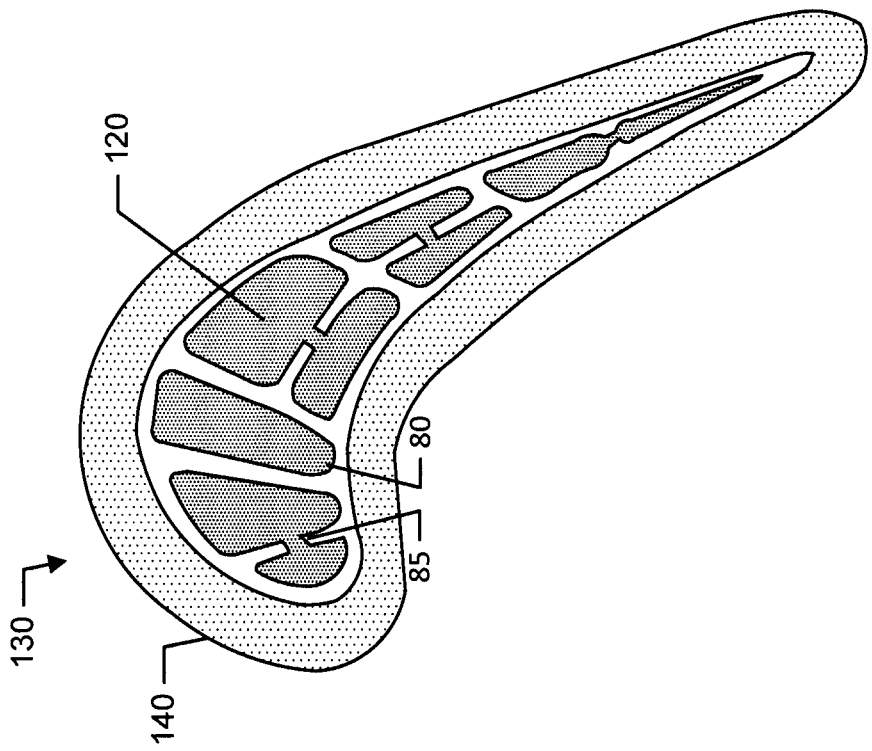
FIG. 4 is a sectional view of a combined core and mold that may be used to manufacture the airfoil of FIG. 2.

Once produced, the core 120 then may be used in a conventional investment casting process and the like so as to form the outer mold or other type of structure. Alternatively, a combined core and mold 130 may be created as is shown in FIG. 4. The combined core and mold 130 may include the core 120 substantially as described above and an outer mold 140. The sidewall 60 and other components of the airfoil 100 may be defined between the core 120 and the outer mold 140. Both the core 120 and the outer mold 140 may be created at the same time in the additive manufacturing processes described herein as opposed to the separate structures from in the traditional manufacturing processes. Again, a ceramic material and more preferably a water soluble ceramic material may be used herein. Other components and other configurations may be used herein.

Figure 5:
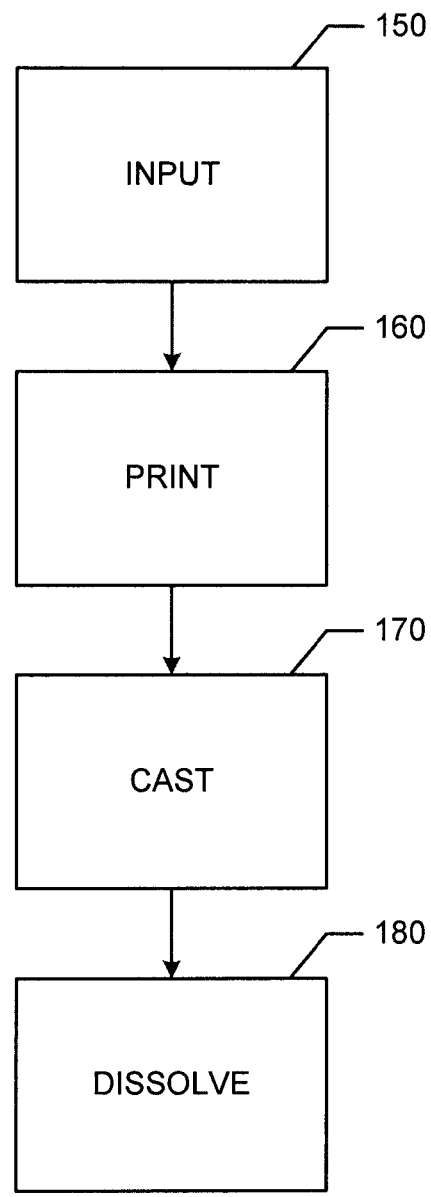
FIG. 5 is a flowchart showing exemplary steps in creating the core of FIG. 3 and/or the combined core and mold of FIG. 4.

FIG. 5 shows a flowchart of exemplary steps in carrying out the methods described herein in whole or in part. At step 150, the desired dimensions of the airfoil 100 or other type of turbine component 110 may be input into the additive manufacturing system. At step 160, the additive manufacturing system may print or otherwise produce the core 120, the combined mold and core 130, the outer mold 140, or other type of mold and the like in the additive manufacturing process. At step 170, the core 120 may be used in a conventional investment casting process and the like to create the airfoil 100 and/or the metallic material may be poured or otherwise casted about the combined mold and core 130 so as to create the airfoil 100. At step 180, the core 120 and/or the combined mold and core 130 may be dissolved via water and the like from the airfoil 100. Dissolving the core 130 thus creates the cooling chambers 80 and other types of internal geometries within the airfoil 100. The outer mold 140 may be dissolved as well or may be otherwise stripped away. The airfoil 100 may now be substantially ready for use and/or further processing. The methods steps described herein are not exclusive. Other or different steps may be used in any desired order.

The methods and systems described herein thus provide for the production of the airfoil 100, other types of turbine components 110, and other components in a fast and efficient manner. Moreover, the airfoil 100 may have advanced and effective internal cooling geometries formed herein. Further, the water soluble ceramic material may be used for the three-dimensional printing of the core 120 and the like so as to avoid the use of hazardous chemicals generally required for leaching. Any suitable ceramic material may be used for three-dimensional printing of the core 120 and/or the combined mold and core 130. The binder jetting processes described herein may be used for three-dimensional printing with any type of ceramic. Other types of additive manufacturing processes may be used herein.

It should be apparent that the foregoing relates only to certain embodiments of the present application and the resultant patent. Numerous changes and modifications may be made herein by one of ordinary skill in the art without departing from the general spirit and scope of the invention as defined by the following claims and the equivalents thereof.

We claim:

1. A method of producing a component, comprising:
creating a dissolvable ceramic material mold in an additive manufacturing process comprising a binder jetting process in which a liquid binding agent is selectively deposited to join powder particles;
casting a metallic material in the dissolvable ceramic material mold;
creating the component; and
dissolving the dissolvable ceramic material mold with water.

2. The method of claim 1, wherein the component comprises an airfoil with internal cooling channels.

3. The method of claim 1, wherein the step of creating the dissolvable ceramic material mold comprises creating a dissolvable ceramic material core.

4. The method of claim 3, wherein the step of casting the metallic material in the dissolvable ceramic material mold comprises casting the metallic material about the dissolvable ceramic material core.

5. The method of claim 3, wherein the step of dissolving the dissolvable ceramic material mold with water comprises dissolving the dissolvable ceramic material core with water.

6. The method of claim 5, wherein the step of dissolving the dissolvable ceramic material core comprises creating a cooling channel in the component.

7. The method of claim 1, wherein the step of creating the dissolvable ceramic material mold comprises creating a dissolvable ceramic material combined core and mold.

8. The method of claim 7, wherein the step of casting the metallic material in the dissolvable ceramic material mold comprises casting the metallic material about the dissolvable ceramic material combined core and mold.

9. The method of claim 7, wherein the step of dissolving the dissolvable ceramic material mold with water comprises dissolving the dissolvable ceramic material combined core and mold with water.

10. The method of claim 9, wherein the step of dissolving the dissolvable ceramic material combined core and mold comprises creating a cooling channel and a sidewall in the component.

11. The method of claim 7, wherein the step of creating the dissolvable ceramic material combined core and mold comprises creating the core and the mold together in the additive manufacturing process.

12. The method of claim 1, wherein the step of creating the dissolvable ceramic material mold in the additive manufacturing process comprises using sodium hydrogen phosphate as the liquid binding agent in the binder jetting process.

13. The method of claim 1, wherein the step of creating the dissolvable ceramic material mold in the additive manufacturing process comprises using alumina flour, zircon flour, sodium hydrogen phosphate, and sugar as the powder particles in the binder jetting process.

14. A combined core and mold for creating a turbine component, comprising:
   an inner core; and
   an outer mold;
   the inner core and the outer mold defining a sidewall and a plurality of inner ribs therebetween;
   the inner core and the outer mold comprising a dissolvable ceramic material suitable for an additive manufacturing process comprising a binder jetting process in which a liquid binding agent is selectively deposited to join powder particles and dissolvable with water.

15. The combined core and mold of claim 14, wherein the turbine component comprises an airfoil with internal cooling channels defined by the sidewall and the plurality of internal ribs.

16. A method of producing a turbine airfoil with a plurality of internal channels, comprising:
   creating a combined core and mold of a dissolvable ceramic material in an additive manufacturing process comprising a binder jetting process in which a liquid binding agent is selectively deposited to join powder particles;
   casting a metallic material in the combined core and mold;
   creating the turbine airfoil; and
   dissolving the dissolvable ceramic material with water within the plurality of internal channels.

17. The method of claim 16, wherein the step of dissolving the dissolvable ceramic material with water comprises dissolving the combined core and mold with water.

18. The method of claim 16, wherein the step of dissolving the dissolvable ceramic material comprises creating the plurality of internal channels and a sidewall in the turbine airfoil.

19. The method of claim 16, wherein the step of creating the combined core and mold comprises creating the core and the mold together in the additive manufacturing process.

20. The method of claim 16, wherein the step of creating the combined core and mold of the dissolvable ceramic material in the additive manufacturing process comprises using sodium hydrogen phosphate as the liquid binding agent in the binder jetting process.

* * * * *